United States Patent
Bertram et al.

(10) Patent No.: US 11,104,756 B2
(45) Date of Patent: Aug. 31, 2021

(54) METHOD TO CONTROL CELL SIZE IN POLYESTER POLYURETHANE FOAMS

(71) Applicant: Inoac USA, Inc., Troy, MI (US)

(72) Inventors: Raymond Bertram, Raritan, NJ (US); Guy L. Crocco, Clarkston, MI (US)

(73) Assignee: Inoac USA, Inc., Troy, MI (US)

( * ) Notice: Subject to any disclaimer, the term of this patent is extended or adjusted under 35 U.S.C. 154(b) by 325 days.

(21) Appl. No.: 16/248,036

(22) Filed: Jan. 15, 2019

(65) Prior Publication Data

US 2020/0223972 A1    Jul. 16, 2020

(51) Int. Cl.
| | |
|---|---|
| *C08G 18/08* | (2006.01) |
| *C08G 18/20* | (2006.01) |
| *C08G 18/32* | (2006.01) |
| *C08G 18/10* | (2006.01) |

(52) U.S. Cl.
CPC .............. *C08G 18/14* (2013.01); *C08G 18/10* (2013.01); *C08G 18/2063* (2013.01); *C08G 18/3221* (2013.01); *C08G 2110/0083* (2021.01)

(58) Field of Classification Search
CPC .... C08G 18/10; C08G 18/14; C08G 18/1833; C08G 18/2063; C08G 18/3206; C08G 18/3221; C08G 18/4238; C08G 18/6644; C08G 2110/005; C08G 2110/0083; C08L 75/04
See application file for complete search history.

(56) References Cited

U.S. PATENT DOCUMENTS

| | | | |
|---|---|---|---|
| 3,391,093 A * | 7/1968 | Frost | C08J 9/144 521/131 |
| 3,476,933 A | 11/1969 | Mendelsohn | |
| 3,567,663 A * | 3/1971 | Triolo et al. | C08J 9/0061 521/130 |
| 4,167,612 A | 9/1979 | Tucker et al. | |
| 4,271,272 A | 6/1981 | Strickman et al. | |
| 5,130,404 A * | 7/1992 | Freeland | C08G 18/0885 528/52 |
| 5,405,885 A * | 4/1995 | Sampara | E01B 31/26 521/132 |
| 6,716,890 B1 | 4/2004 | Niederoest et al. | |
| 2017/0209897 A1* | 7/2017 | Clamor | B32B 15/16 |

* cited by examiner

*Primary Examiner* — John M Cooney
(74) *Attorney, Agent, or Firm* — Dykema Gossett PLLC

(57) ABSTRACT

A direct and simple method to control cell size in a polyurethane foam is disclosed. Polyurethane foam is made by mixing prepolymer with foam-forming ingredients comprising isocyanate and water which react to give carbon dioxide. The reaction is driven by a catalyst and results in a foam structure with cells of a particular size. Using the addition of a pre-determined amount of mineral oil, the coalescence of neighboring cells of the foam structure may be advantageously controlled to form a cell structure with a desired average cell size.

12 Claims, 3 Drawing Sheets

METHOD TO CONTROL CELL SIZE IN POLYESTER POLYURETHANE FOAMS

BACKGROUND a. Technical Field

The disclosure relates to a method of manufacturing polyester polyurethane foams having a desired cell size.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

Polyurethane foam has been utilized in numerous applications in industry (e.g., filter and baffle systems for jet fuel), transportation, medical devices and consumer goods. As an example, polyurethane foam based on isocyanate-terminated prepolymer technology is a useful product due to a combination of the material's properties. The glass transition temperature ("$T_g$") of this material is higher than that of conventional urethane foams or polyester urethane foams. The desired $T_g$ is dictated by the foam's intended application, but it will typically be above room temperature. This allows the foam to have flexibility, strength, and resilience at elevated temperatures.

The structure of the polyurethane foam impacts the efficacy of the foam's application in these areas. Therefore, it is advantageous for a producer of polyurethane foam for a specific industry or application to adapt its manufacturing process to efficiently produce foam that has the desired structure for its intended application.

Foams may be generally classified as open-celled or closed-celled. A foam is generally considered closed-celled when a substantial portion of the cells are completely closed, that is to say, when many of the cells are completely isolated by material and do not allow the communication of air between individual cells. Open-celled foam is where the material between the cells have been broken. Generally, this allows air to fill the "open" space inside the foam making the foam weaker or softer feeling than closed-cell foam. Because of this, for example, open-cell foam may be significantly better at minimizing sound transmission over its closed-cell counter parts. Closed-cell foam will have improved strength, higher R-value (insulative), and greater resistance to the leakage of air or water vapor than open-cell foam. Additionally, closed-cell foam is denser, requires more material, and is therefore more expensive.

A closed-celled structure includes an individual cell is disposed between ligaments with or otherwise having a cell membranes. An example closed-celled structure is depicted in FIG. 4. Conversely, an open-celled structure includes an individual cell disposed between ligaments of the skeletal structure but without any cell membrane(s), thereby allowing communication(s) between individual adjacent cells to occur. An example open-celled structure is depicted in FIG. 5.

In a closed-celled structure, such as shown in FIG. 4, the ligaments 10 of the cell structure are connected by membranes 12 of cell material. This has the effect of isolating the cell from its neighbors and prohibiting the passage of air or gas between neighboring cells. Conversely, the ligaments 10 of the open-celled structure in FIG. 5 do not have connecting membranes, are open to their neighbors allowing the passage of air and gas between the cells.

Depending on the application, either closed-cell or open-cell foam may be used. It is established in the art that the application of mineral oil during processing gives more open foam in polyether technology.

However, another important property of polyurethane foams is its cell size. As the cell size of the foam decreases, the foam's characteristics are impacted in a number of ways due to the increase in the amount of material present in the foam. For one, the breathability of the foam decreases because the finer cells present a greater area of contact with an incoming air stream, which creates a frictional drag that reduces the passage of air. Additionally, the decrease in foam cell size corresponds to an increase in material, which impacts the foam's physical properties, like compressive strength, initial thermal conductivity, and thermal conductivity aging. For example, polyurethane foam for scrubbing sponges would require a coarse cell foam (i.e., larger cell structure), while industrial buffing pads would necessitate a fine cell foam (i.e., smaller cell structure). A reduction in cell size generally causes a reduction in the initial thermal conductivity, mostly because of the reduction in the thermal radiation component to foam thermal conductivity. Additionally, the impact of cell size reduction on foam compressive strength is usually negative.

It would therefore be desirable to control cell size in polyester polyurethane foams.

The foregoing discussion is intended only to illustrate the present field and should not be taken as a disavowal of claim scope.

SUMMARY

In an embodiment, a portioned and timely application of mineral oil may be utilized to compel the manufacture of polyurethane foam with a desired cell foam size. The addition of a strong gel catalyst gives a rapid gel reaction between the prepolymer and the cross-linker and chain-extenders. The resulting polymer efficiently captures the carbon dioxide ("$CO_2$") gas generated from the reaction of the prepolymer and water to generate a final foam with a fine cell structure (i.e., with many cells). The addition of mineral oil causes coalescence between neighboring cells to give a coarse cell structure (i.e., with fewer cells). The amount of coalescence is proportional to the amount of mineral oil added.

An advantage of the embodiments described in this document is a direct, simple and inexpensive method to direct cell size in polyurethane foam. The foregoing and other aspects, features, details, utilities, and advantages of the present disclosure will be apparent from reading the following description and claims, and from reviewing the accompanying drawings.

DETAILED DESCRIPTION

Figure 1:
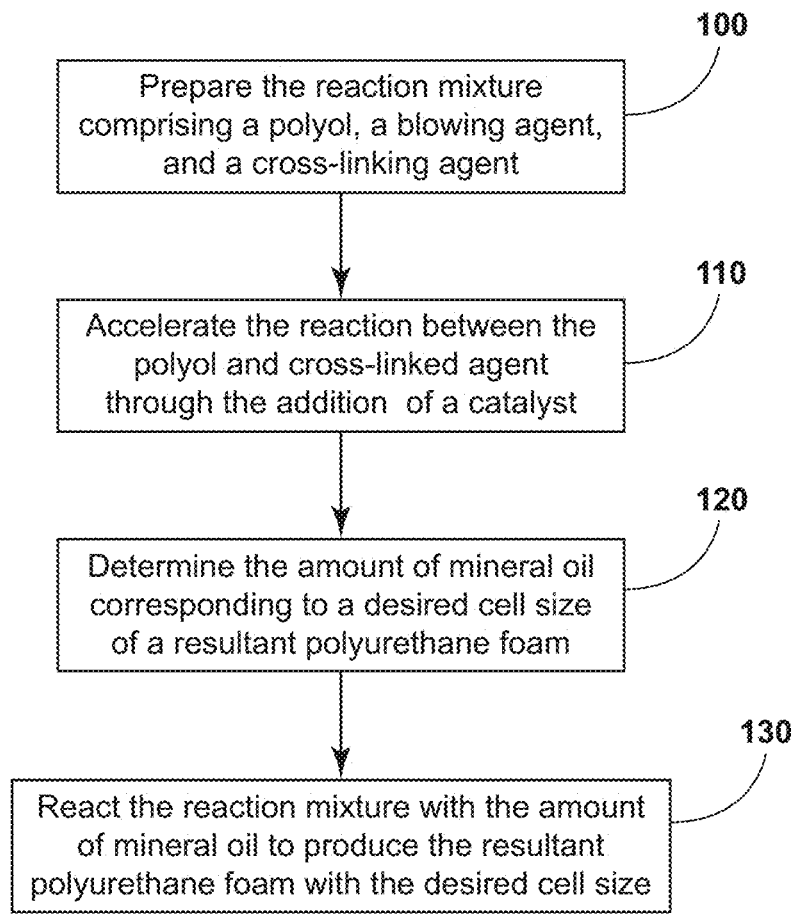
FIG. 1 is a flowing chart detailing an embodiment of the method.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

A description of one or more embodiments consistent with the present disclosure will now be set forth. During production of polyurethane foam, cell size control is typically practiced by calibrating the conditions in a mixing chamber via isocyanate injection pressure, the back pressure created from the mixing chamber outlet device, and the dynamics of the localized nucleation from the mixer speed. Additionally, the major chemicals, polyols and isocyanates may have gas added to them to create nucleating sites or may be stripped of gasses to remove nucleating sites. However, such an approach is neither simple nor direct. Embodiments consistent with the present teachings provide a simple and direct method to control cell size in the manufacture of polyester polyurethane foam made with a prepolymer. In embodiments of such method, the cell size, reported in pores per inch (ppi) or cells per inch (cpi), can be varied from very fine (e.g., 110 ppi/cpi) to very coarse (e.g., 5 ppi/cpi).

Before proceeding to a detailed description of various embodiments, a general description of general reaction and chemical processes that result in polyurethane foam will be set forth. The term "cell structure" should be interpreted to mean the structure of the foam matrix in terms of size, distribution, and the number and type of cells contained therein. A uniform or regular cell structure means, that the greater majority of the cells are of the same or approximately the same size.

Polyurethane foam may be characterized as having a skeletal-like cell structure, comprising a celled networked material having a plurality of cells disposed between ligaments of the material. One reaction that forms the building blocks of a polyurethane is the addition of an alcohol (generally a polyol or a mixture of polyols) to an isocyanate or a mixture of isocyanates. This results in a prepolymer. As used herein, the term prepolymer is used to refer to urethane-modified polyol, i.e. polymeric material produced by reaction of polyol with isocyanate having urethane linkages for use in the production of end-product polyurethane material.

To achieve maximum polymerization, the process may be carried out in a mixture of dimethyl sulfoxide and a ketone, which works to keep the polymer in solution instead of being stopped by the precipitation of the high-molecular-weight product. A polyol is an organic compound that contains at least two hydroxyl groups (e.g., a polyether polyol). An isocyanate is an organic compound having a functional group R—N═C═O. Dimethyl sulfoxide is an organosulfur compound with the formula $(CH_3)_2SO$. A ketone is an organic compound having the structure R—C(═O)—R'.

In one method to create polyurethane foam, an isocyanate may react with water to give $CO_2$ and an amine. In this process, the water may be added to the hot polymer at a stage when many isocyanate end groups are present. The $CO_2$ forms bubbles that expand in the hot polyurethane, giving it a foam-like texture that it keeps as the polyurethane cools. The new amine groups that are created in the process react with the remaining excess isocyanate groups to give urea bonds. The foam structure is reinforced by further cross-linking reactions. The generation of a foam as described in the above reaction requires the formation of the gas (e.g., $CO_2$) at the same time as the urethane polymerization is occurring.

The process result may result in a polyester polyurethane foam. Polyester is an organic compound made from a plurality of esters ($R—CO_2-R'$) that are linked into chains.

The compound used to form the $CO_2$, in this example, is water, which is referred to in the art as the blowing agent. A blowing agent may be substance capable of producing a cellular structure via a foaming process in a variety of materials, such as polymers. As known to those skilled in the art, water is the most typical blowing agent utilized in the preparation of polyurethane foam. The amount added may correspond to the desired foam density and may vary depending on the operating pressure of the foaming container.

The reaction of the isocyanate with the alcohol or polyol may be done in the presence of a catalyst. Catalysts are used to control the relative rates of water-isocyanate and polyol-isocyanate reactions. The amount of catalyst used depends upon the formulation employed and the type of catalyst used, as known to those skilled in the art. In the art, tertiary amines are commonly used polyurethane foam catalysts. However, the polymerization reaction may also be activated with ultraviolet light.

Cross-linking agents are commonly included in foam-forming composition to aid in foam stability. Generally, cross-linking agents are relativity small molecules.

For a polyurethane foam to fulfill most common applications, there must be a moderate amount of cross-linking between polymer chains and some method of creating bubbles in the melted polymer. To achieve cross-linking, an excess of isocyanate may be used, which results in the polymer chains ending with unreacted isocyanate functional groups. The polymeric isocyanate reacts with the urethane linkages in other polymer chains to link them. Less cross-linking means longer, flexible segments in the resulting polymer, making the resulting product more elastic. More cross-linking results in tough or rigid polymers.

One or more surfactants may be employed in the foam-forming process. Surfactants may promote the nucleation of bubbles while stabilizing the cellular structure of the resulting foam. They may also be used to emulsify the liquid components and regulate cell size.

Optionally, other additives may be added to the reaction mixture or reaction chamber. These optional additives do not have a detrimental effect on the properties of the final product, but can include fire retardants, stabilizers, antimicrobial compounds, dyes or pigments, and antistatic agents.

FIG. 1 is a simplified flowchart showing, in an embodiment, a method of manufacturing a polyester polyurethane foam, in an embodiment.

In an embodiment, such as described in step 100 of FIG. 1, the polyol used in the production of the prepolymer for polyurethane foam is wholly or at least predominantly a polyester polyol. However, various other embodiments may utilize other polyol mixtures, such as polyether polyol. In an embodiment, such as described in step 110, the reaction between the polyol and a cross-linking agent is accelerated through the addition of a catalyst.

In this embodiment, in step 110, the addition of a strong gel catalyst compels rapid gelling between the prepolymer and the cross-linker and chain-extenders. This allows the polymer to efficiently capture the $CO_2$ gas generated from the reaction of the prepolymer and the blowing agent resulting in a foam structure with many cells (i.e., a fine cell structure).

In an embodiment, in step 120, an amount of mineral oil (e.g., naphthenic oil) corresponding to a desired foam cell size is determined. In an embodiment, in step 130, the determined amount of mineral oil is reacted with the reaction mixture to generate a resultant polyurethane foam with the desired cell size.

In step 130, the addition of mineral oil causes coalescence between neighboring cells to result in fewer cells (i.e., a coarse cell structure). In causing the coalescence, the mineral oil may act in a similar manner to a defoaming agent and break down foam that has already formed. The mineral oil is insoluble in the foam medium and has specific surface active properties that may result in the breakdown of the cell windows and struts. The amount of mineral oil included in the reaction mixture directly affects the quantity of struts being broken during generation of the cell's foam structure. The act of struts being dissolved by the mineral oil causes multiple cells to join into one larger cell, increase the resulting foam structure's cell size (i.e., create a more coarse foam structure). Additionally, a larger cell foam structure resultant from this embodiment of the process may have thicker struts due to the material comprising the broken down struts migrating to the remaining struts of the resulting cell structure.

A variety of different mineral oils may be used in a plurality of embodiments. The type of mineral oil used may have an effect on the manner and efficacy of the coalescence between the cells of the foam structure. Certain types of mineral oil are more soluble in the reaction mixture and therefore give more latitude in cell size control as well as enable more uniform cell size distribution throughout the cell foam. In an embodiment, controlled and calculated amounts of naphthenic oil added to the reaction mixture resulted in accurate control of the size and uniformity of the resultant cell foam structure. Conversely, utilization of aromatic oil and paraffinic oil has been determined to be unusable for an embodiment. These oils have been determined to be too cell destabilizing to the foam structure and caused boiling rather than a controlled coalescence of the cells.

There may be windows present in the resultant cell foam structure due to the surface tension of the prepolymer reaction mixture and the relative prominence of utilized mineral oil's cell disruption.

In an embodiment, the mineral oil may be introduced at an elevated temperature. This would result in an amplified effect on cell coalescence during the generation of the resultant cell foam structure. Elevated temperatures however may result in the undesirable effect of boiling. In an embodiment, a surfactant may be introduced to reduce the opportunity of boiling and would result in a foam structure with greater uniform cell structure. Conversely, introduction of the mineral oil in a cold environment may result in reduced disbursement into the reaction system and localized cell disruption, causing large double-cells in the foam and a finer, less uniform background cell foam structure.

In embodiments, the blowing agent may comprise isocyanate or water that reacts with the mixture to create gaseous products and other byproducts that are formed by a chemical reaction of the chemical blowing agent. In another embodiment Ecomate®, a blowing agent by Foam Supplies, Inc. headquartered in Earth City, Mo., may be used to produce lower density foam with only minor effects on the physical properties when evaluated up to 10 php at room temperature. At php levels above 10, the resultant cell structure become too irregular and therefore php levels above 10 have been determined to be unusable for an embodiment.

In embodiments, the catalyst may comprise 2,2'-dimorpholinodiethylether (DMDEE). In alternative embodiments, suitable catalysts may be triethylenediamine ("TEDA"); Bis [2-(diemethylamino)ethyl]ether; N,N-dimethylaminopropylamine (DMAPA); N,N-dimethylcycloheylamine; N,N,N',N',N"-pentamethyldiethhylenetriamine; 2-(2-(2-dimethylamino ethoxy)-ethylmethylamino)-amino; N-cyclohexyldiethanolamine; diethanolamine; N,N-diethylethanolamine; trimethylamine; N,N,N'N'-tetramethylethylenediamine; or N,N,N',N' tetramethyl-1,3-butanediamine.

In embodiments, the cross-linking agent may comprise glycerol, ethylenediamine tetrakis(ethoxylated-block-propoxylate), or tetrol (trade name Voranol 800™ or EDAP800™), XK-435 (COIM™ polyol tradename). In these embodiments, they may be used in amounts such that the total cross-linker composition makes up 0-25% of the hydroxyl equivalents in the reaction system. The amount used varies based on desired density, hardness, and cell size as cross-linking affects each one of these properties.

In an embodiment, the Si—O—C type silicone surfactants act to stabilize the system and broaden the processing latitude. Specifically, Tegostab B8330™, Tegostab B8002™, and Tegostab B4900™ give especially large processing windows.

In embodiments, one or more additives may be utilized to further increase processing latitude. Incorporation of fatty acid, such as oleic acid, can retard initial reactivity may add another dimension to cell size control. Oleic acid may be added in amounts ranging from 0.5 parts to 5 parts in order to decrease reactivity by as much as 10-50%, respectively.

In embodiments, the reaction to form the desired polyester polyurethane foam with controlled cell size may be carried out batch-wise, semi-continuously, or continuously.

The foam may be produced with the reaction mixture ranging from 68° F.-90° F. in order to control reactivity and cell size. Producing the foam at higher temperatures results in coarser cells because the material is thicker and less nucleation occurs in the system.

While temperature increases the reaction rate, one embodiment may utilize oleic acid (or another fatty acid) to slow the reactivity down. In one embodiment, an optimal method to control the system with mineral oil is controlling temperature (used to control viscosity) and fatty acid content (used to offset increase in reactivity from excess temperature). The foam's cell size is sensitive to mix time and duration of agitation at any given mixer speed/pressure. In an embodiment, it is optimal to minimize mixing duration while maintaining laminar flow throughout the production system.

TABLE 1

Non-Limiting Examples.

|  | Foam 1 (control) | Foam 2 | Foam 3 |
|---|---|---|---|
| GT-168 | 100 php | — | — |
| Diexter-G 1100-225 | 21.33 php | — | — |
| Glycerine | 0.53 php | — | — |
| Water | 2.13 php | — | — |
| Tegostab B8330 | 1.20 php | — | — |
| ZF-24 | 0.45 php | — | — |
| Dabco 33-LV | 0.20 php | — | — |
| Reactint Orange | 0.5 php | — | — |
| Index | 110 | — | — |
| Hyprene L2000 | 0 php | 1 php | 2 php |
| Density (pcf) | 2.99 | 2.81 | 3.02 |
| Air Flow (cfm) | 0.07 | 0.06 | 0.25 |
| CFD @ 25% (psi) | 2.61 | 2.08 | 2.63 |
| Cell Count (cpi) | 84 | 28 | 11 |

Figure 2:
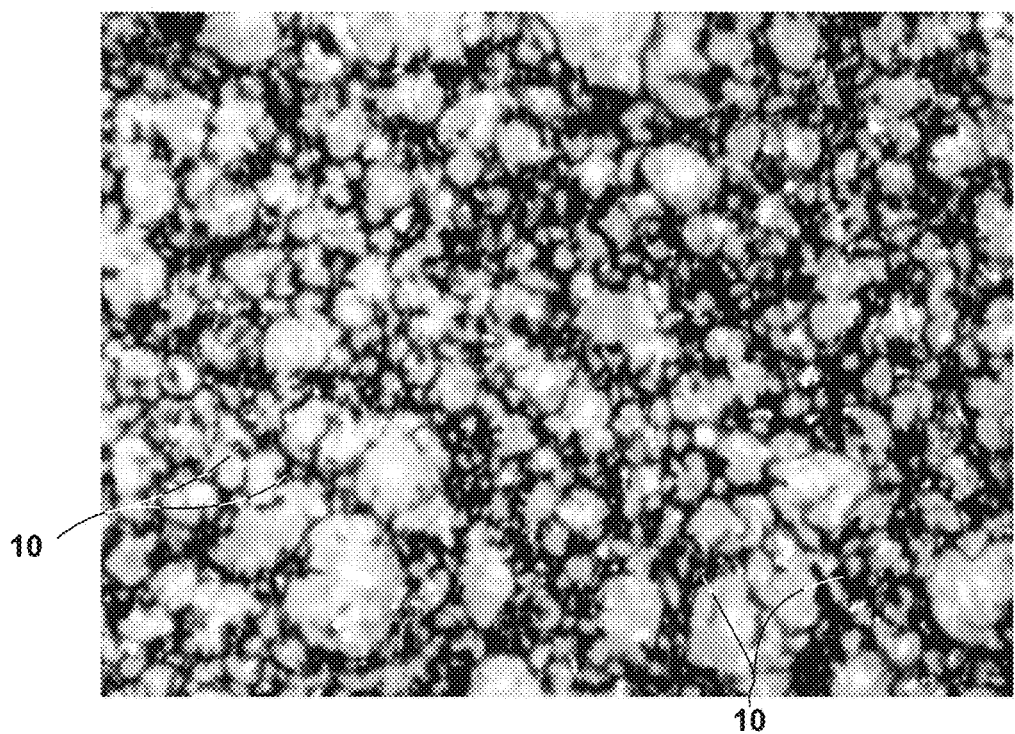
FIG. 2 is a polyurethane foam structure with a fine cell size.
Figure 3:
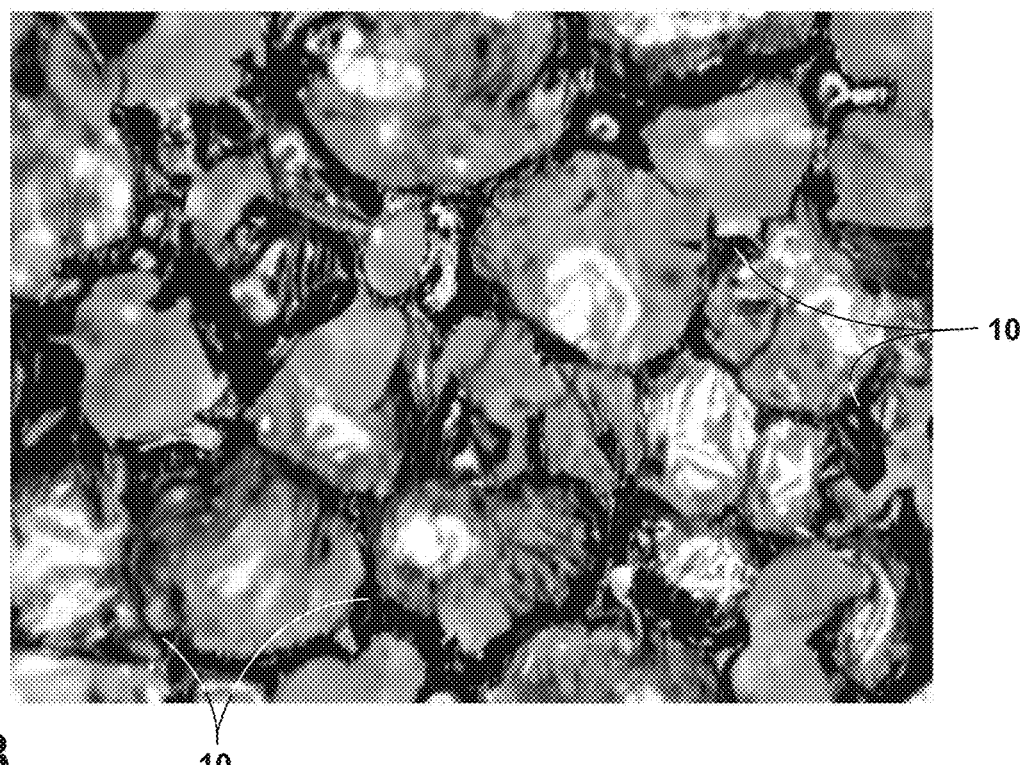
FIG. 3 is a polyurethane foam structure with a coarse cell size.
Figure 4:
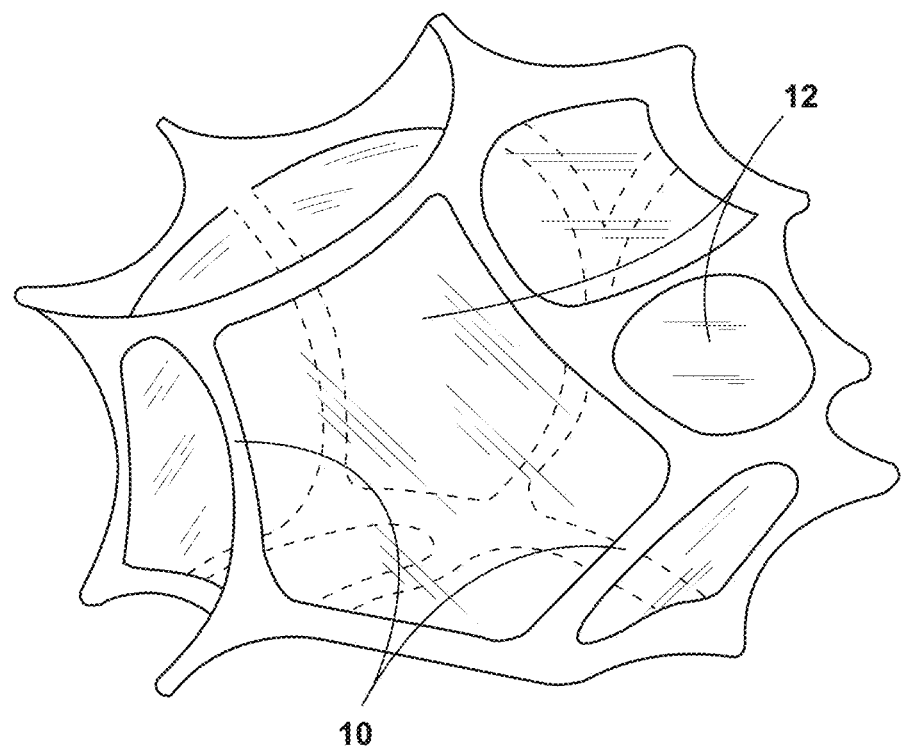
FIG. 4 is an enlarged perspective view of an individual cell illustrating a closed-cell foam structure.
Figure 5:
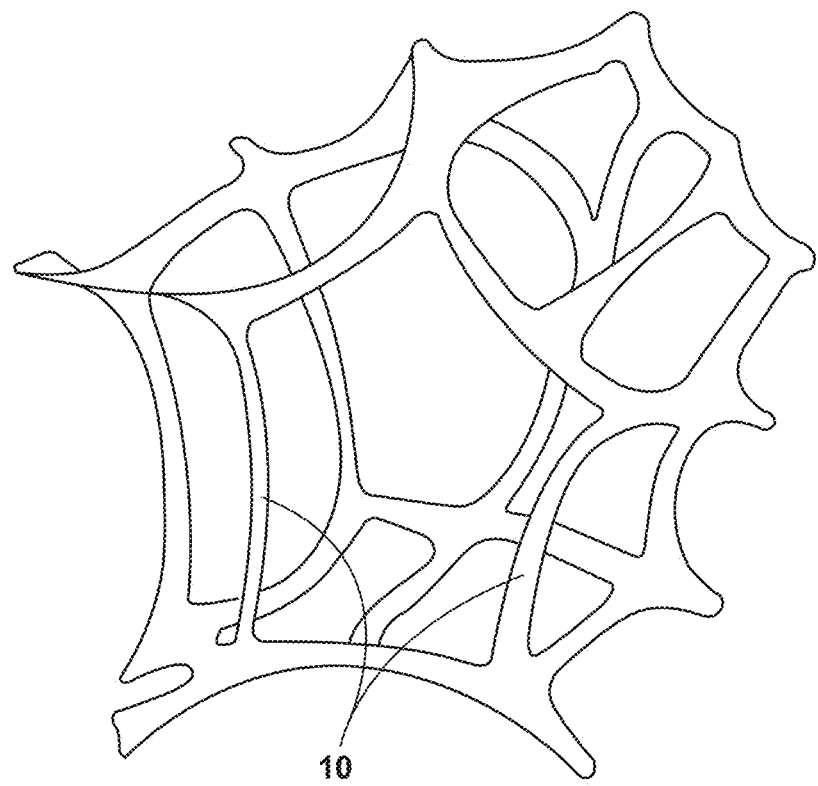
FIG. 5 is an enlarged perspective view of an individual cell illustrating an open-cell foam structure.

FIGS. 2-3 show photographs taken under magnification of a fine and coarse cell structure responsively. Both of the photos depicted as FIGS. 2 and 3 were taken under the same magnification. As demonstrated, the cell count (measured in cpi) has been reduced, in a controlled manner, between FIG. 2 and FIG. 3 through the deliberate introduction of a naphthenic process oil. In this particular embodiment, Hyprene L2000™.

FIG. 2 depicts polyester polyurethane foam generated without the introduction of mineral oil, specifically, in this embodiment, Hyprene L2000™. The cell count of this foam structure is 84cpi. FIG. 3 depicts a polyester polyurethane foam generated by the same process, but timely introducing a proportioned amount of Hyprene L2000™ after the introduction of catalyst, causing the coalescence of neighboring cells into larger cells. The cell count of this foam structure is 28cpi. As demonstrated in Table 1 above, the density, air flow, and fluid flow properties of the larger-celled foam structure in FIG. 3 has been altered as a result of the coalescence. As demonstrated by the distances between the various respective cell ligaments 10, the size and area of each individual cell is, on average, increased as compared to the size and area of each individual cell in FIG. 2. An embodiment of the method used to calculate the cpi of the foams depicted in FIGS. 2 and 3, and which is generally accepted in the art for the calculation of the cpi of a foam, is further described below.

Observing the cpi of resultant polyurethane foam is disclosed in ASTM D 35-76 (1998) procedure B, which is hereby incorporated by reference. In this testing method, the cellular specimen may be sliced to provide smooth surface. The cell walls may then be accented by the use of a marking pen. The average chord length may be obtained by counting the cell wall intersections and converting this value to average cell size by mathematical derivation.

The apparatus required to perform the cell measurement test may involve (i) a cell size specimen slicer or cutting blade apparatus capable of providing a smooth surface, (ii) an optical magnification system capable of 5 to 25 times magnification with a calibrated scale of the appropriate length, and (iii) a highlighting marker that does not contain a solvent that will attack the polymer system. The highlighting marker may utilize an ink that contrasts with the color of the foam being measured.

One procedure to measure the cell size of a polyurethane foam may proceed as follows. Generally, only a single sample of foam is required to be tested. Using the cell size specimen slicer or cutting blade apparatus, cut a 25 mm (1 in.) section across the width of the sample being tested. Identify with the highlighting marker the length (L) and width (W) direction in the middle of the cut strip of sample. Then, cut another 25 mm (1 in) section from the center of the strip resulting in a sample that is 25 mm by 25 mm (1 in. by 1 in.). Shave the adjacent planes of the sample resulting in exposed cut cells in the L, W and thickness (T) directions. Then, using the highlight marker, coat the shaved planes with a uniform coating in such a manner that additional cell walls are not broken.

Continuing the measurement test, the highlighted sample may be placed in a manner that allows one to observe cells in the T direction. The number of cells walls (i.e., 10 in FIGS. 2 and 3) that intersect the reference line may be counted. Generally, the reference line should be suitable to the cell size being measure. As known to those skilled in the art, a minimum cell count of 20 is adequate. The cells counted may be a random selection with the reference line adjusted to start the count to include a full cell at the beginning of the line.

The average cell cord length (t) may be determined by dividing the length of the reference line by the number of cells counted to obtain the average chord length. The calculation for the cell size in each direction may be measured as follows:

$$d = t(1.623) \qquad \text{Equation (1)}$$

Where d is the cell size in mm, and t is the average cell cord length in mm.

For foam samples with an apparent cell size of 0.3 mm or smaller, the cell size may also be measured by the use of a B&L Model STZ-201 Monocular Zoomscope, available from LEICA in Deerfield Ill., with a 10 mm calibrated reference line. For samples with an apparent cell size of 1.0 mm or greater, a handheld eyepiece, such as available from Edmund Scientific in Barrington, N.J., with a calibrated scale of 30 mm length can be used.

Although only certain embodiments have been described above with a certain degree of particularity, those skilled in the art could make numerous alterations to the disclosed embodiments without departing from the scope of this disclosure. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. Additionally, the terms "electrically connected" and "in communication" are meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A method for making a polyurethane foam with a pre-determined cell size, comprising preparing a reaction mixture comprising:
   a polyol;
   an isocyanate;
   a blowing agent; and
   a cross-linking agent;
   accelerating a reaction between the polyol and the isocyanate through the addition of a catalyst to the reaction mixture;
   determining an amount of mineral oil corresponding to the pre-determined cell size, wherein the amount of mineral oil consists of naphthenic mineral oil; and
   reacting the reaction mixture with the amount of mineral oil to form the polyurethane foam with the pre-determined cell size, wherein the reacting step compels the coalescence of a first cell of the polyurethane foam with a second cell of the polyurethane foam.

2. The method of claim 1 wherein the blowing agent comprises water.

3. The method of claim 1 wherein the polyol is substantially a polyester.

4. The method of claim 1 wherein the cross-linking agent is glycerol.

5. The method of claim 1 wherein the reaction mixture further comprises a surfactant.

6. The method of claim 5 wherein the surfactant is a Si—O—C based silicone surfactant.

7. The method of claim 1 wherein the catalyst is 2,2'-dimorpholinodiethylether (DMDEE).

8. The method of claim 1 wherein the catalyst is triethylenediamine (TEDA).

9. The method of claim 1 wherein the reaction mixture further comprises oleic acid.

10. The method of claim 1 wherein the reacting step is performed at a temperature range between 68° F. -90° F.

11. The method of claim 1 wherein the resulting polyurethane foam has between 50 and 100 pores per inch.

12. The method of claim 1 wherein the resulting polyurethane foam has between 10 and 50 pores per inch.

* * * * *